(12) United States Patent
Kaburagi et al.

(10) Patent No.: US 11,652,241 B2
(45) Date of Patent: May 16, 2023

(54) BATTERY MANUFACTURING METHOD

(71) Applicant: Nissan Motor Co., Ltd., Yokohama (JP)

(72) Inventors: Tomohiro Kaburagi, Kanagawa (JP); Hajime Satou, Kanagawa (JP); Kazuyuki Yoda, Kanagawa (JP); Shigeo Watanabe, Kanagawa (JP); Yusuke Mizuno, Kyoto (JP); Yusuke Emori, Kyoto (JP); Takuya Sakurai, Kyoto (JP)

(73) Assignee: Nissan Motor Co., Ltd., Yokohama (JP)

( * ) Notice: Subject to any disclaimer, the term of this patent is extended or adjusted under 35 U.S.C. 154(b) by 225 days.

(21) Appl. No.: 16/979,898

(22) PCT Filed: Mar. 26, 2019

(86) PCT No.: PCT/JP2019/012805
§ 371 (c)(1),
(2) Date: Sep. 11, 2020

(87) PCT Pub. No.: WO2019/198495
PCT Pub. Date: Oct. 17, 2019

(65) Prior Publication Data
US 2021/0028496 A1 Jan. 28, 2021

(30) Foreign Application Priority Data

Apr. 9, 2018 (JP) .............................. JP2018-074692

(51) Int. Cl.
*H01M 10/0585* (2010.01)
*H01M 50/46* (2021.01)
(Continued)

(52) U.S. Cl.
CPC ....... *H01M 10/0585* (2013.01); *H01M 4/621* (2013.01); *H01M 4/66* (2013.01); *H01M 50/46* (2021.01)

(58) Field of Classification Search
CPC .................................................. H01M 10/0585
See application file for complete search history.

(56) References Cited

U.S. PATENT DOCUMENTS

2014/0363727 A1* 12/2014 Ko ..................... H01M 10/0463
429/149
2016/0359197 A1* 12/2016 Watarai ............. H01M 10/0569
(Continued)

FOREIGN PATENT DOCUMENTS

EP 2 648 263 A2 10/2013
EP 3 285 309 A2 2/2018
(Continued)

*Primary Examiner* — Stephan J Essex
(74) *Attorney, Agent, or Firm* — Global IP Counselors, LLP

(57) ABSTRACT

A method for manufacturing a battery has a stacking step in which a plurality of unit cells are stacked, the unit cells being such that a positive electrode obtained by a positive electrode active material layer containing an electrolytic solution disposed on a positive electrode current collector, and a negative electrode obtained by a negative electrode active material layer containing an electrolytic solution disposed on a negative electrode current collector with a separator interposed therebetween. In the stacking step, each time one of the unit cells is stacked, the stack of the unit cells are pressed from the stacking direction.

7 Claims, 5 Drawing Sheets

(51) Int. Cl.
*H01M 4/62* (2006.01)
*H01M 4/66* (2006.01)

(56) References Cited

U.S. PATENT DOCUMENTS

2018/0123162 A1* 5/2018 Kaga ................... H01M 50/119
2018/0212273 A1* 7/2018 Lee ..................... H01M 50/411
2018/0316042 A1* 11/2018 Kuhara ............. H01M 10/0413

FOREIGN PATENT DOCUMENTS

| | | |
|---|---|---|
| JP | 2011-151016 A | 8/2011 |
| JP | 2013-254727 A | 12/2013 |
| JP | 2015-118816 A | 6/2015 |
| JP | 2017-98235 A | 6/2017 |
| WO | 01/59868 A1 | 8/2001 |
| WO | WO-2017061807 A1 * | 4/2017 .......... H01M 10/052 |

* cited by examiner

BATTERY MANUFACTURING METHOD

CROSS-REFERENCE TO RELATED APPLICATIONS

This application is a U.S. national stage application of International Application No. PCT/JP2019/012805, filed on Mar. 26, 2019, which claims priority to Japanese Patent Application No. 2018-074692, filed on Apr. 9, 2018. The entire disclosure of Japanese Patent Application No. 2018-074692 is incorporated in this specification by reference.

BACKGROUND

Technical Field

The present invention relates to a battery manufacturing method.

Background Information

Development of secondary batteries that can be repeatedly charged and discharged as motor-driving power sources for electric vehicles (EV) and hybrid electric vehicles (HEV) is widespread. A secondary battery is manufactured by: forming a unit cell in which a positive electrode that comprises a positive electrode active material layer containing an electrolytic solution, and a negative electrode that comprises a negative electrode active material layer containing an electrolytic solution, are stacked with a separator interposed therebetween; and sealing, inside an outer cladding, a stack in which a plurality of the unit cells are stacked.

For example, in the method for manufacturing a battery disclosed in patent Japanese Laid-Open Patent Application No. 2013-254727 (Document 1): an electrode active material slurry that includes an electrode active material, a binder, and a solvent is applied to the surface of a current collector to form an application film; and dry electrodes formed by drying the application film are used to create unit cells.

SUMMARY

According to investigations performed by the inventors, it has been established that in a step for manufacturing a dry electrode that contains a binder as disclosed in Patent Document 1, there are cases where cracking occurs when the electrode active material slurry is dried. Cracking of the electrode can cause a great reduction in battery performance. The inventors continued their investigations into a method for creating a unit cell using an electrode comprising a current collector and active material layers containing an electrolytic solution, as a manufacturing method that does not include a step for drying an electrode active material slurry, in order to prevent the occurrence of such cracking.

An electrode containing an electrolytic solution is softer and more readily deformable than a dry electrode. In addition, an electrode containing an electrolytic solution is wet, and therefore is more susceptible to formation of creases (irregularities) in the current collector and/or the separator in formation of the unit cell than dry electrodes. According to investigations performed by the inventors, it has been established that when a plurality of unit cells are molded by pressing all at once after the plurality of unit cells are stacked, there is a possibility that irregularities will remain in the surface and/or the interior of the unit cells. This can raise the internal resistance of the unit cells as well as the contact resistance between the unit cells, and cause the internal resistance of the battery to increase.

The present invention was contrived in view of the matters described above, it being an object of the present invention to provide a method for manufacturing a battery in which the internal resistance of the battery can be reduced by molding unit cells during stacking of the unit cells.

The battery manufacturing method according to the present invention for achieving the above-mentioned object has a stacking step in which a plurality of unit cells are stacked, the unit cells being obtained by stacking a positive electrode that is obtained by a positive electrode active material layer containing an electrolytic solution being disposed on a positive electrode current collector, a negative electrode that is obtained by a negative electrode active material layer containing an electrolytic solution being disposed on a negative electrode current collector, and a separator interposed between the positive electrode and the negative electrode. Furthermore, in the stacking step, each time one of the unit cells is stacked, the stack of the unit cells are pressed from a stacking direction.

BRIEF DESCRIPTION OF THE DRAWINGS

Referring now to the attached drawings which form a part of this original disclosure.

DETAILED DESCRIPTION OF EMBODIMENTS

Figure 1:
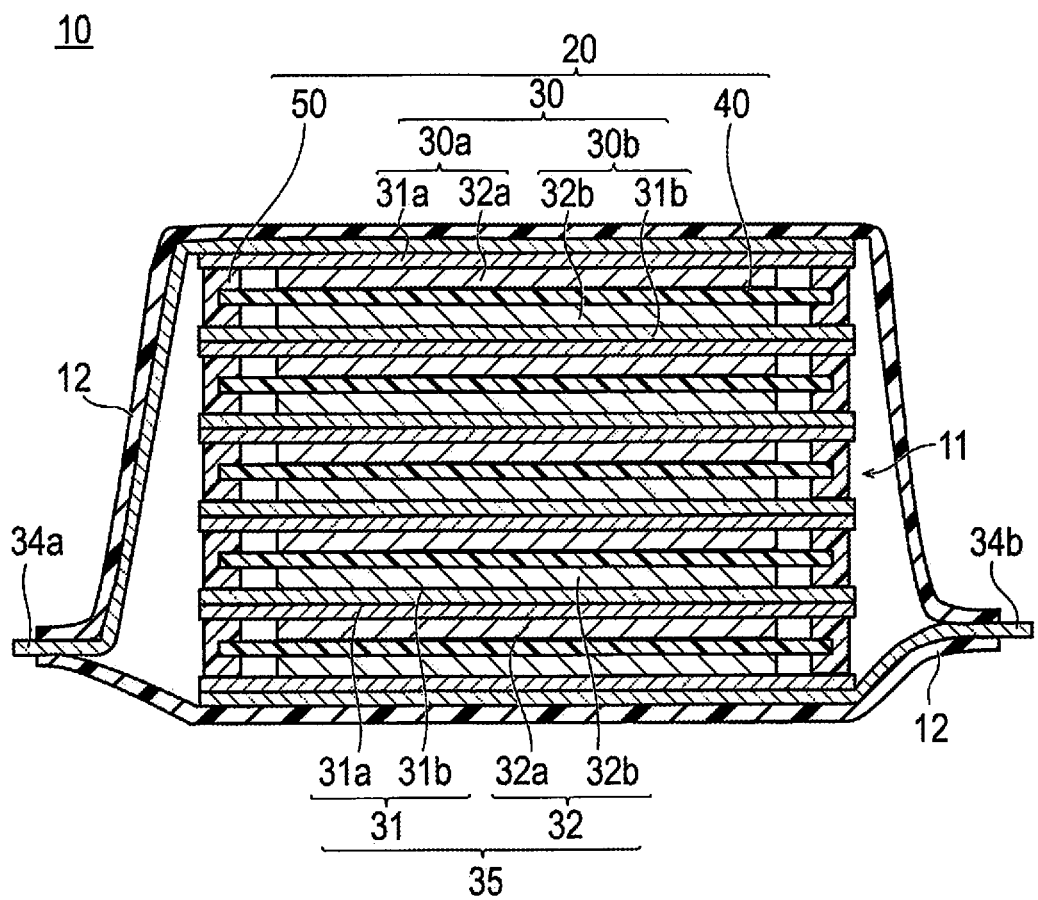
FIG. 1 is a cross-sectional diagram showing an overview of the overall structure of a battery according to one embodiment of the present invention.

A preferred embodiment of the present invention is described below with reference to the drawings. However, the technical scope of the present invention should be determined on the basis of the recitations in the claims, and is in no way limited to only the embodiment described below. After the battery according to the present invention is described in terms of advantages below, a method for manufacturing the battery according to the present invention is described in detail. Dimensions and proportions in the drawings are exaggerated for expediency of description, and can differ from actual proportions. In this specification, "X-Y" as used to indicate ranges refers to values "equal to or greater than X and equal to or less than Y."

Battery

A bipolar lithium ion secondary battery, which is one type of non-aqueous-electrolyte secondary battery, is described as one example of the battery according to the present invention. However, the battery to which the present invention is applied is not limited to bipolar lithium ion secondary batteries. A "bipolar lithium ion secondary battery" is a secondary battery that includes bipolar electrodes and is configured so that charging and discharging are performed due to transfer of lithium ions between a positive electrode and a negative electrode. For example, the present invention can also be applied to any conventionally well-known secondary battery, such as a so-called parallel stacked battery in which electrodes are connected in parallel in a power-generating element. In the description below, the bipolar lithium ion secondary battery is referred to simply as a "battery."

FIG. 1 is a cross-sectional diagram in which a battery 10 according to one embodiment of the present invention is schematically represented. The battery 10 is preferably structured so that the power-generating element in which the charge/discharge reaction actually progresses is sealed inside an outer cladding 12, as shown in FIG. 1, in order to prevent impact from the outside and/or environmental degradation.

As shown in FIG. 1, the power-generating element in the battery 10 of the present embodiment is a stack 11 formed by a plurality of unit cells 20 being stacked. The power-generating element is also referred to as a "stack 11" below. The number of unit cells 20 that are stacked is preferably adjusted in accordance with a desired voltage.

As shown in FIG. 1, a positive electrode 30a and a negative electrode 30b constitute a bipolar electrode 35 in which an electrically coupled positive electrode active material layer 32a is formed on one surface of a current collector 31 and an electrically coupled negative electrode active material layer 32b is formed on the opposite surface of the current collector 31.

In FIG. 1, the current collector 31 is depicted as a stacked structure (two-layer structure) in which a positive electrode current collector 31a and a negative electrode current collector 31b are combined, but the current collector 31 can instead be a single-layer structure composed of a single material.

Furthermore, in the battery 10 shown in FIG. 1, a positive electrode current collector plate (positive electrode tab) 34a is disposed so as to be adjacent to the positive electrode-side positive electrode current collector 31a, the positive electrode current collector plate 34a being extended and led out from the outer cladding 12. Moreover, a negative electrode current collector plate (negative electrode tab) 34b is disposed so as to be adjacent to the negative electrode-side negative electrode current collector 31b, the negative electrode current collector plate similarly being extended and led out from the outer cladding 12.

Unit Cell

Figure 2:
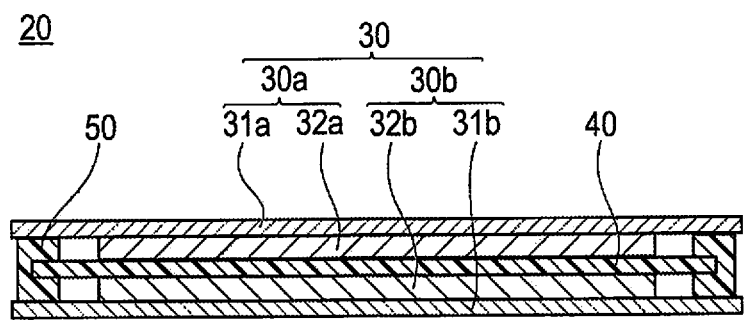
FIG. 2 is a cross-sectional diagram showing a unit cell of the secondary battery shown in FIG. 1.

As shown in FIG. 2, the unit cell 20 is configured from the positive electrode 30a, the negative electrode 30b, and an electrolyte layer 40. In the positive electrode 30a, a positive electrode active material layer 32a containing an electrolytic solution is disposed on the positive electrode current collector 31a. In the negative electrode 30b, a negative electrode active material layer 32b containing an electrolytic solution is disposed on the negative electrode current collector 31b.

The positive electrode active material layer 32a and the negative electrode active material layer 32b are disposed so as to face each other with the electrolyte layer 40 interposed therebetween. The positive electrode current collector 31a and the negative electrode current collector 31b are positioned at the outermost layers of the unit cell 20.

Seal parts 50 are disposed at outer peripheral portions of the unit cell 20. The seal parts 50 liquid-tightly seal the outer peripheries of the positive electrode active material layer 32a, the negative electrode active material layer 32b, and the electrolyte layer 40, preventing a liquid junction from forming due to leakage of the electrolytic solution. The positive electrode current collector 31a and the negative electrode current collector 31b are electrically separated from each other within the unit cell 20, preventing short-circuiting due to the positive electrode current collector 31a and the negative electrode current collector 31b coming into contact with each other.

Current Collector

The current collector 31 (adjacent the positive electrode current collector 31a and the negative electrode current collector 31b) has a function for mediating transfer of electrons from one surface in contact with the positive electrode active material layer 32a to another surface in contact with the negative electrode active material layer 32b. The material constituting the current collector 31 is not particularly limited. For example, an electroconductive resin or metal can be used.

From the standpoint of reducing the weight of the current collector 31, the current collector 31 is preferably a resin current collector formed from an electroconductive resin. From the standpoint of blocking transfer of lithium ions between the unit cells 20, a metal layer can be provided to part of the resin current collector.

Specifically, examples of the electroconductive resin serving as the material that constitutes the resin current collector include resins in which an electroconductive filler is added, as needed, to an electroconductive polymer material or a non-electroconductive polymer material. Examples of the electroconductive polymer materials include polyaniline, polypyrrole, polythiophene, polyacetylene, polyparaphenylene, polyphenylenevinylene, and polyoxadiazole. Such electroconductive polymer materials are useful in terms of simplifying manufacturing steps and reducing the weight of the current collector due to having adequate electroconductivity even when no electroconductive filler is added.

Examples of the non-electroconductive polymer materials include polyethylene (PE, such as high-density polyethylene (HDPE) and low-density polyethylene (LDPE)), polypropylene, (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Such non-electroconductive polymer materials can have exceptional potential resistance and solvent resistance.

Any electroconductive substance can be used as the electroconductive filler without particular limitation. Examples of materials having exceptional electroconductivity, potential resistance, and lithium-ion-blocking properties include metals and electroconductive carbons. The metals are not particularly limited. However, it is preferable to include at least one metal selected from the group consisting of nickel, titanium, aluminum, copper, platinum, iron, chromium, tin, zinc, indium, antimony, and potassium, or to include an alloy or metal oxide that includes these metals. The electroconductive carbons also are not particularly limited. It is preferable to include at least one selected from the group consisting of acetylene black, Vulcan®, Black Pearl®, carbon nanofiber, Ketjen Black®, carbon nanotubes (CNTs), carbon nanohorns, carbon nanoballoons, and fullerenes.

The amount of electroconductive filler added is not particularly limited, provided that the amount makes it possible to impart adequate electroconductivity to the current collector. The amount added is preferably about 5-35 vol %.

In cases where the current collector 31 is formed from a metal, examples of the metal include aluminum, nickel, iron, stainless steel, titanium, and copper. Aside from these metals, a cladding material of nickel and aluminum, a cladding material of copper and aluminum, or a plating material of these metals can be preferably used. A foil can also be formed on the metal surface by coating with aluminum. Among these options, aluminum, stainless steel, copper, and nickel are preferred from the standpoint of, inter alia, electron transmittivity, battery action potential, and close adhesiveness of the negative electrode active material through sputtering onto the current collector.

Electrode Active Material Layer (Positive Electrode Active Material Layer, Negative Electrode Active Material Layer)

Electrode active material layers (the positive electrode active material layer 32a, the negative electrode active material layer 32b) 32 include an electrode active material (positive electrode active material or the negative electrode active material) and a electrolytic solution. The electrode active material layers 32 can also include a coating agent (coating resin, electroconductive auxiliary agent), an electroconductive member, etc., as needed. Furthermore, the electrode active material can also include an ion-transmitting polymer, etc., as needed.

The electrolytic solution included in the electrode active material layers 32 functions as a dispersion medium for the electrode active material in a step for preparing a slurry (described below). From the standpoint of omitting a step for injecting the electrolytic solution in steps after formation of the electrodes 30 and reducing the number of steps, the electrolytic solution in the electrode active material layers 32 preferably has the same composition as the electrolytic solution included in the electrolyte layer 40 of the battery 10.

The electrolytic solution has a form in which a lithium salt is dissolved in a solvent. Examples of the solvent constituting the electrolytic solution include ethylene carbonate (EC), propylene carbonate (PC), dimethyl carbonate (DMC), diethyl carbonate (DEC), ethyl methyl carbonate, and other carbonates. Examples of the lithium salt include: $LiPF_6$, $LiBF_4$, $LiSbF_6$, $LiAsF_6LiClO_4$, $Li[(FSO_2)_2N]$ (LiFSI), and other lithium salts of inorganic acids; and $LiN(CF_3SO_2)_2$, $LiN(C_2F_5SO_2)_2$, $LiC(CF_3SO_2)_3$, and other lithium salts of organic acids.

Positive Electrode Active Material

Examples of the positive electrode active material include: $LiMn_2O_4$, $LiCoO_2$, $LiNiO_2$, $Li(Ni-Mn-Co)O_2$, oxides in which some of the transition metals are substituted by other elements, and other lithium-transition metal composite oxides; lithium-transition metal phosphate compounds; and lithium-transition metal sulfate compounds. Depending on the situation, two or more positive electrode active materials can be used in combination. From the standpoint of capacity and output characteristics, it is preferable to use a lithium-transition metal composite oxide as the positive electrode active material. It is more preferable to use a composite oxide that contains lithium and nickel as the positive electrode active material. It is even more preferable to use $Li(Ni-Mn-Co)O_2$, oxides in which some of the transition metals are substituted by other elements (also referred to simply as "NMC composite oxides" below), lithium-nickel-cobalt-aluminum composite oxides (also referred to simply as "NCA composite oxides" below), etc. The NMC composite oxides have a layered crystal structure in which lithium atom layers and transition metal (with Mn, Ni, and Co arranged in an orderly manner) atom layers are alternatingly overlapped with oxygen atom layers interposed therebetween. One lithium atom is included per atom of transition metals, and the amount of lithium drawn out is twice that of spinel-based lithium manganese oxide; specifically, the supply capability is doubled, and it is possible to have high capacity.

Negative Electrode Active Material

Examples of the negative electrode active material include: graphite, soft carbon, hard carbon, and other carbon materials; lithium-transition metal composite oxides (e.g., $Li_4Ti_5O_{12}$); metal materials (tin, silicon); and lithium-alloy-based negative electrode materials (e.g., lithium-tin alloys, lithium-silicon alloys, lithium-aluminum alloys, lithium-aluminum-manganese alloys, etc.). Depending on the situation, two or more negative electrode active materials can be used in combination. From the standpoint of capacity and output characteristics, it is preferable to use a carbon material, a lithium-transition metal composite oxide, or a lithium-alloy-based negative electrode material as the negative electrode active material. As shall be apparent, negative electrode active materials other than those described above can also be used. (Meth)acrylate-based copolymers and other coating resins have properties that facilitate adhesion to carbon materials in particular. Therefore, from the standpoint of providing an electrode material that is structurally stabilized, it is preferable to use a carbon material as the negative electrode active material.

Electroconductive Auxiliary Agent

The electroconductive auxiliary agent is used as a coating agent that coats the surface of the electrode active material together with the coating resin. The electroconductive auxiliary agent can contribute to improvement in output characteristics at a high rate in the battery by forming an electron transmission path within the coating agent and reducing the electron transfer resistance of the electrode active material layers 32.

Examples of the electroconductive auxiliary agent include: aluminum, stainless steel, silver, gold, copper, titanium, and other metals, as well as alloys and metal oxides of these metals; and graphite, carbon fiber (specifically vapor-grown carbon fiber (VGCF), etc.), carbon nanotubes (CNT), carbon black (specifically acetylene black, Ketjen Black®, furnace black, channel black, thermal lamp black, etc.), and other types of carbon. However, the electroconductive auxiliary agent is not limited to these examples. Substances in which a granular ceramic material or resin material is plated or otherwise coated with the metal materials described above can also be used as the electroconductive auxiliary agent. Among these electroconductive auxiliary agents, from the standpoint of electrical stability, it is preferable to include at least one selected from the group consisting of aluminum, stainless steel, silver, gold, copper, titanium, and carbon, more preferable to include at least one selected from the group consisting of aluminum, stainless steel, silver, gold, and carbon, and even more preferable to include at least one carbon. One of these electroconductive auxiliary agents can be used alone, or two or more can be used in combination.

The electroconductive auxiliary agent preferably has a particulate or fibrous form. In cases where the electroconductive auxiliary agent is a particulate, the form of the particles is not particularly limited. Any form, such as a fine-powder form, a spherical form, a rod form, a needle form, a plate form, a columnar form, an irregular form, a scale form, or a fusiform, can be employed. The average particle diameter (primary particle diameter) in cases where the electroconductive auxiliary agent has a particulate form is preferably no more than 100 nm. In this specification, "particle diameter" refers to the greatest distance from among distances between any two points on the contour of the electroconductive auxiliary agent. A value calculated as the average value of the particle diameters of particles observed in several or several tens of fields of view using a scanning electron microscope (SEM), a transmission electron microscope (TEM), or another observation means is employed as the value of the "average particle diameter."

Electroconductive Member

The electroconductive member has a function for forming an electron transmission path within the electrode active material layers 32. In particular, at least part of the electroconductive member preferably forms an electroconductive passage via which two primary surfaces of the electrode active material layers 32 are electrically connected to each other. Having such a form further reduces the electron transfer resistance in a thickness direction of the electrode active material layers 32, and therefore the output characteristics can be even further improved at a high rate in the battery. It is possible to confirm, by observing a cross-section of the electrode active material layers 32 using a SEM or an optical microscope, whether at least part of the electroconductive member forms an electroconductive passage via which the two primary surfaces of the electrode active material layers 32 are electrically connected to each other.

The electroconductive member is preferably electroconductive fiber having a fibrous form. Specific examples include: PAN-based carbon fiber, pitch-based carbon fiber, and other carbon fiber; electroconductive fiber obtained by uniformly dispersing a highly electroconductive metal or graphite in synthetic fiber; metal fiber in which a metal such as stainless steel is formed into fiber; electroconductive fiber in which the surface of organic fiber is coated with a metal; and electroconductive fiber in which the surface of organic fiber is coated with a resin that contains an electroconductive substance. Among these fibers, carbon fiber is preferred due to having exceptional electroconductivity and low weight.

In the battery 10 of the present embodiment, a thickness of the electrode active material layers 32, as pertains to the positive electrode active material layer 32a, is preferably 150-1500 µm, more preferably 180-950 µm, and even more preferably 200-800 µm. A thickness of the negative electrode active material layer 32b is preferably 150-1500 µm, more preferably 180-1200 µm, and even more preferably 200-1000 µm. If the thickness of the electrode active material layers 32 is a value equal to or greater than the lower-limit value described above, the energy density of the battery can be adequately raised. If the thickness of the electrode active material layers 32 is a value equal to or less than the upper-limit value described above, the structure of the electrode active material layers 32 can be adequately maintained.

In the battery 10 of the present embodiment, other than the electrode active material, as well as the electroconductive member, the ion-transmitting polymer, the lithium salt, and the coating agent (coating resin, electroconductive auxiliary agent), which are used as needed, other members can be used, as appropriate, as constituent members of the electrode active material layers 32. However, from the standpoint of improving the energy density of the battery, it is preferable not to incorporate members that do not contribute much to the progression of the charge/discharge reaction. For example, use of a binder that is added in order to bind the electrode active material and other members and maintain the structure of the electrode active material layers 32 is preferably avoided as much as possible. Examples of binders having the functions described above include polyvinylidene fluoride (PVdF) and other solvent-based binders, and styrene-butadiene rubber (SBR) and other water-based binders. Specifically, the binder content is preferably 10 mass % or less, more preferably 5 mass % or less, even more preferably 2 mass % or less, particularly preferably 1 mass % or less, and most preferably 0 mass % relative to 100 mass % of the total solid content included in the electrode active material layers 32.

Electrolyte Layer

The electrolyte layer 40 is a layer in which an electrolyte is held by a separator, the electrolyte layer 40 being disposed between the positive electrode active material layer 32a and the negative electrode active material layer 32b, and preventing direct contact between these two layers. The electrolyte used in the electrolyte layer 40 of the present embodiment is not particularly limited. Examples include electrolytic solutions and gel polymer electrolytes. Using these electrolytes can ensure high lithium ion transmission properties.

The same electrolytic solution as is used in the electrode active material layers 32 can be used in the electrolyte layer 40. The concentration of the lithium salt in the electrolytic solution is preferably 0.1-3.0 M, and more preferably 0.8-2.2 M. The amount used in cases where additives are used is preferably 0.5-10 mass %, and more preferably 0.5-5 mass %, relative to 100 mass % of the electrolytic solution before the additives are added.

Examples of additives include vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyloxymethyl ethylene carbonate, allyl oxymethyl ethylene carbonate, acryl oxymethyl ethylene carbonate, methacryloxymethyl ethylene carbonate, ethynyl ethylene carbonate, propargyl ethylene carbonate, ethynyl oxymethyl ethylene carbonate, propargyl oxyethylene carbonate, methylene ethylene carbonate, and 1,1-dimethyl-2-methylene ethylene carbonate. Among these additives, vinylene carbonate, methyl vinylene carbonate, and vinyl ethylene carbonate are preferred, and vinylene carbonate and vinyl ethylene carbonate are more preferred. One of these cyclic carbonate esters can be used alone, or two or more can be used in combination.

The gel polymer electrolyte has a configuration obtained by injecting the electrolytic solution described above into a matrix polymer (host polymer) composed of an ion-transmitting polymer. Using a gel polymer electrolyte as the electrolyte eliminates fluidity of the electrolyte and is exceptional in terms of simplicity due to blocking the transmission of ions between layers. Examples of the ion-transmitting polymer used as the matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HFP), polymethyl methacrylate (PMMA), and copolymers of these.

The matrix polymer of the gel polymer electrolyte forms a cross-linked structure, thereby making it possible to realize exceptional mechanical strength. A suitable polymerization initiator is used in forming the cross-linked structure. Heat-induced polymerization, UV-ray-induced polymerization, radiation-induced polymerization, electron-beam-induced polymerization, or another polymerization process is to be implemented on a polymerizable polymer (e.g., PEO or PPO) for forming a polymer electrolyte.

The separator has a function for holding the electrolyte to ensure lithium ion transmission properties between the electrode 30a and the electrode 30b, and a function for forming a partition between the electrode 30a and the electrode 30b.

Examples of the form of the separator can include porous-sheet separators composed of a polymer or fiber that absorbs and holds the electrolyte, and non-woven-fabric separators.

Positive Electrode Current Collector Plate and Negative Electrode Current Collector Plate The material constituting the current collector plates 34a, 34b is not particularly limited. Well-known electroconductive materials that are conventionally used as current collector plates in lithium ion secondary batteries can be used. The material constituting the current collector plates 34a, 34b is preferably, e.g., aluminum, copper, titanium, nickel, stainless steel, alloys of these, or other metal materials. From the standpoint of low weight, high corrosion resistance, and high electroconductivity, aluminum and copper are more preferred, and aluminum is particularly preferred. In each of the positive electrode current collector plate 34a and the negative electrode current collector plate 34b, the same material or different materials can be used.

Seal Parts

The seal parts 50 have a function for preventing contact between the current collectors 31 and preventing short-circuiting in end parts of the unit cells 20. The material constituting the seal parts 50 is to have insulation properties, sealing properties (liquid-tightness), heat resistance at temperatures at which the battery operates, etc. For example, acrylic resins, urethane resins, epoxy resins, polyethylene resins, polypropylene resins, polyimide resins, and rubbers (ethylene-propylene-diene rubber: EPDM) can be used. In addition, isocyanate-based adhesives, acrylic-resin-based adhesives, cyanoacrylate-based adhesives, etc., can be used, and hot-melt adhesives (urethane resins, polyamide resins, polyolefin resins), etc., can also be used. Among these materials, polyethylene resins and polypropylene resins are preferably used as the material constituting an insulating layer from the standpoint of corrosion resistance, chemical resistance, ease of handling (film formability), economy, etc. A resin in which ethylene, propylene, and butene are copolymerized and which has an amorphous polypropylene resin as a main component is preferably used.

Outer Cladding

In the present embodiment shown in FIG. 1, the outer cladding 12 is configured in the form of a bag from a laminate film, but the present invention is not limited to this configuration. For example, a well-known metal can case, etc., can be used. The outer cladding 12 is preferably configured from a laminate film from the standpoint of exceptional increases in output and cooling performance, as well as from the standpoint of making it possible to appropriately use the battery 10 as a battery for a large-scale apparatus such as an EV or a HEV. Examples of laminate films that can be used include those obtained by laminating polypropylene (PP), aluminum, and nylon in the stated order to yield a three-layer structure, but the present invention is in no way limited to these materials. In addition, the group pressure applied to the stack 11 from the outside can easily be adjusted, and the electrolyte layer 40 is easily adjusted to a desired thickness; therefore, the outer cladding 12 is preferably an aluminate laminate.

Method for Manufacturing Battery

One aspect of the present invention pertains to a method for manufacturing a battery. A battery manufactured using the battery manufacturing method according to the present embodiment can be used as a non-aqueous-electrolyte secondary battery such as the bipolar battery according to the embodiment described above.

Figure 3:
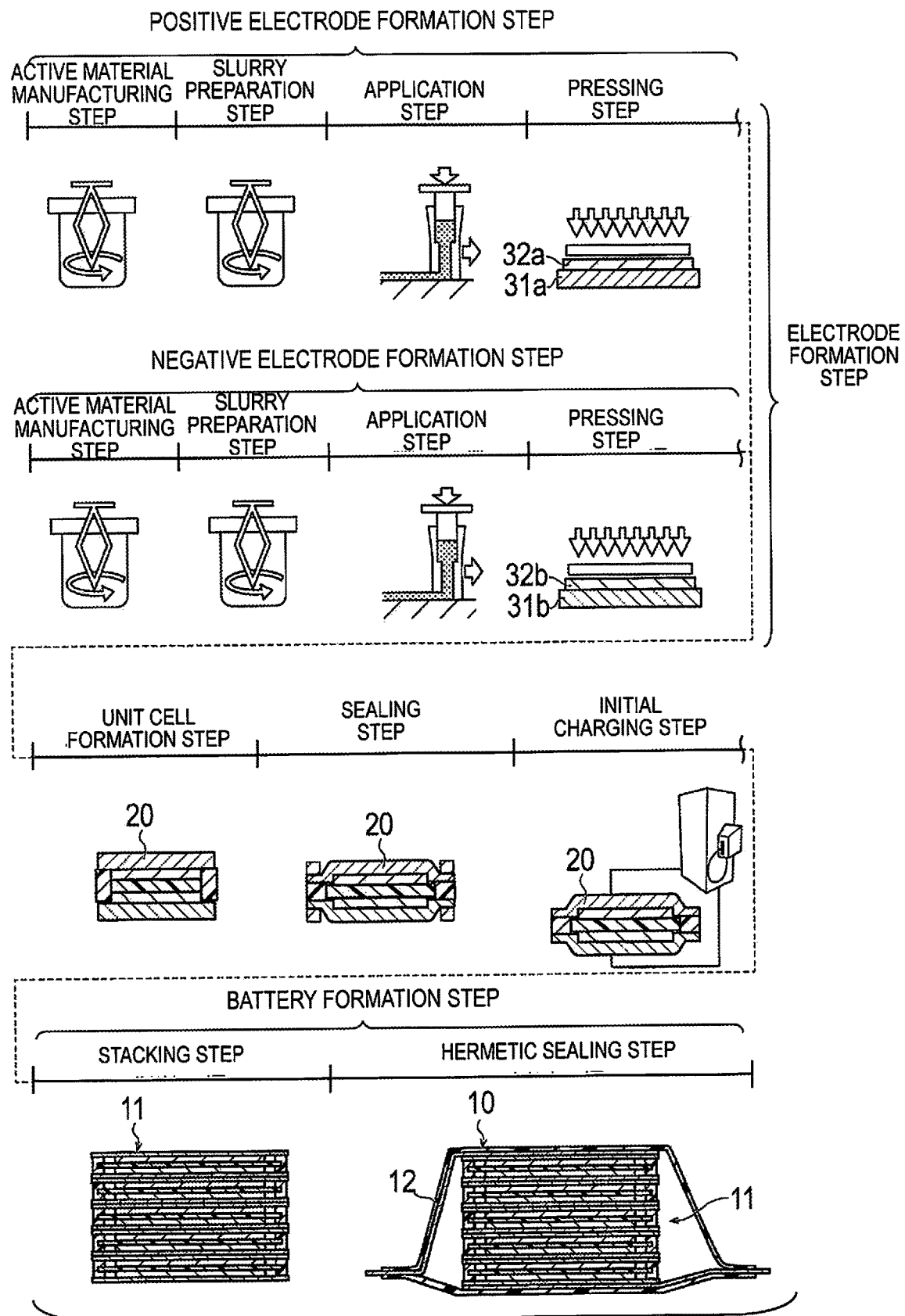
FIG. 3 is an overview diagram showing one example of a series of steps in a battery manufacturing method according to one embodiment of the present invention.
Figure 4:
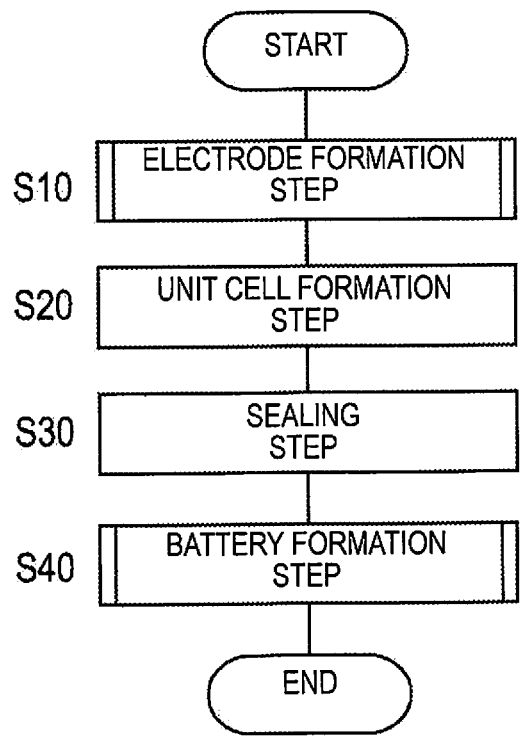
FIG. 4 is a flow chart for illustrating the battery manufacturing method according to one embodiment of the present invention.

FIG. 3 is an overview diagram showing one example of a series of steps in a method for manufacturing a battery 10 according to the present embodiment. FIG. 4 is a flow chart for illustrating the method for manufacturing a battery 10 according to the present embodiment. The method for manufacturing a battery 10 according to the present embodiment has an electrode formation step (S10), a unit cell formation step (S20), a sealing step (S30), and a battery formation step (S40), as shown in FIGS. 3 and 4.

In the method for manufacturing a battery 10 shown in FIG. 3, an initial charging step is performed between the sealing step (S30) and the battery formation step (S40), but the present invention is not limited to this configuration. The initial charging step can be performed after the battery formation step (S40). In addition, in the electrode formation step (S10) shown in FIG. 3, an example is shown in which an application film obtained through an application step is cut into segments that are then pressed one at a time, but the present invention is not limited to this configuration. The application step and a pressing step can be performed continuously using a roll-to-roll process.

In the method for manufacturing a battery 10 according to the present embodiment, the battery formation step (S40) necessarily includes a stacking step (S41) in which, during stacking of a plurality of unit cells 20, each time one or a plurality of unit cells 20 are stacked, the stacked unit cells 20 are pressed from the stacking direction. In the method for manufacturing a battery 10 according to the present embodiment, carrying out pressing each time a unit cell 20 is stacked makes it possible to adjust the thickness of the unit cells 20 and mold the unit cells 20 to a suitable inter-electrode distance. This makes it possible to reduce the internal resistance of the unit cells 20. The "inter-electrode distance" refers to the distance between surfaces of the active material layers in one bipolar electrode 35. Irregularities in the surfaces of the unit cells can also be flattened by pressing, and therefore it is possible to reduce the contact resistance between the unit cells 20. As a result, the internal resistance of the battery can be reduced.

The method for manufacturing a battery 10 according to the present invention is described in detail below so as to include the characteristics described above.

Electrode Formation Step

Figure 5:
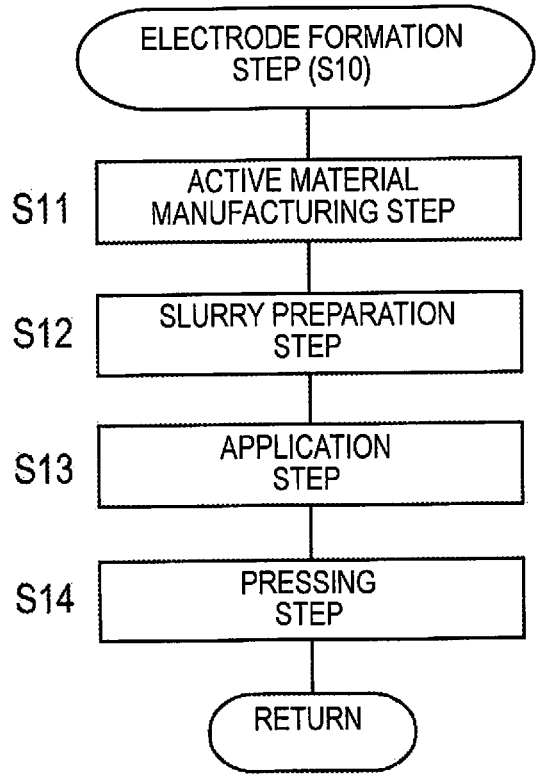
FIG. 5 is a subroutine flow chart for the electrode formation step (S10) shown in FIG. 4.

The electrode formation step (S10) is described first with reference to FIG. 5. FIG. 5 is a subroutine flow chart for the electrode formation step (S10) shown in FIG. 4. As shown in FIG. 5, the electrode formation step (S10) according to the present embodiment preferably includes an active material manufacturing step (S11), a slurry preparation step (S12), an application step (S13), and a pressing step (S14).

Active Material Manufacturing Step

The coated electrode active material is manufactured in the active material manufacturing step. The method for manufacturing a coated electrode active material is not particularly limited. Examples include the following method. First the electrode active material is introduced into an all-purpose mixer and is stirred at a speed of 10-500 rpm, and a solution (coating resin solution) that contains a coating resin and a solvent is added dropwise to the mixture over a period of 1-90 minutes. Methanol, ethanol, isopropanol, or other alcohols can be suitably used as the solvent in this instance. The electroconductive auxiliary agent is then furthermore added and mixed in. The temperature is then raised to 50-200° C. while the stirring is performed, and the pressure is reduced to 0.007-0.04 MPa, after which these conditions are maintained for 10-150 minutes, thereby making it possible to obtain a coated electrode active material.

Slurry Preparation Step

The electrode active material and the electrolytic solution, which is a dispersion medium, are mixed to prepare an electrode active material slurry. The electrode active material slurry is a mixture that necessarily includes the electrode active material and the electrolytic solution. With respect to the solid content ((coated) electrode active material, electroconductive member, ion-transmitting polymer, lithium salt, etc.) included in the electrode active material slurry, the same configuration as was described above (type, amount, etc.) can be employed, and therefore detailed description of this configuration is omitted here. Small amounts of a binder can also be added, as needed, to an application liquid. However, the binder content in the application liquid is preferably 10 mass % or less, more preferably 5 mass % or less, even more preferably 2 mass % or less, particularly preferably 1 mass % or less, and most preferably 0 mass % relative to 100 mass % of the total solid content included in the electrode active material layers 32.

The electrolytic solution (dispersion medium) constituting the electrode active material slurry is eventually used as a electrolytic solution constituting the electrode active material layers 32. Because the electrolytic solution (dispersion medium) constituting the electrode active material slurry is the same as the electrolytic solution constituting the electrode active material layers 32, detailed description of the liquid electrode is omitted here.

The method for mixing the components included in the electrode active material slurry and preparing the electrode active material slurry is not particularly limited. Conventionally well-known expertise can be referred to, as appropriate, with respect to the sequence for adding the members and the method for carrying out mixing. However, because the solid content concentration of the electrode active material slurry is comparatively high, it is preferable to use a mixer that can impart high shear as the mixer for mixing the materials. Specifically, a planetary mixer, a kneader, a homogenizer, an ultrasonic homogenizer, a disperser, or another bladed stirrer is preferred, a planetary mixer being particularly preferred form the standpoint of churning in particular. The specific method for mixing is also not particularly limited, but it is preferable to implement churning at a higher solid content concentration than the final solid content concentration, subsequently add a dispersion medium component, and then carry out further mixing to thereby prepare the electrode active material slurry. The mixing time is not particularly limited. A uniform mixture should be achieved. As an example, churning and subsequent mixing are each to be performed in about 10-60 minutes, and each step can be carried out once or a plurality of times.

Application Step

In the application step, the electrode active material slurry obtained as described above is applied to the surfaces of the current collector 31 to form application films. The application films eventually constitute the electrode active material layers 32.

A thickness of the application films obtained by applying the electrode active material slurry in the application step is not particularly limited, and is to be set as appropriate so that the aforementioned thickness of the electrode active material layers 32 is achieved.

Application means for implementing the application in the application step is not particularly limited, and conventionally well-known application means can be used as appropriate. Among such application means, application means with which it is possible to apply the electrode active material slurry at an application speed at which comparatively high shear force can be imparted during application are preferred from the standpoint of obtaining application films (electrode active material layers 32) that have a highly flat surface by applying the electrode active material slurry, which has a high solid content concentration. Among these application means, an application process performed by a slit-die coater that spreads out the electrode active material slurry from slits and applies the slurry is one example of an optimal application means due to yielding exceptional application of a thin film and exceptional uniformity in application thickness.

In the application step according to the present embodiment, after the electrode active material slurry is applied and the application films are obtained, the resultant application films are not subjected to any drying process performed through heating. This makes it possible to suppress cracking of the electrode active material layers 32 and reduce manufacturing costs required for a drying process. In cases where the electrode active material slurry is not subjected to heating and drying after application, it is difficult to cut out an electrode in a desired area after the application of the electrode active material slurry. Thus, in the method for manufacturing a battery 10 according to the present embodiment, it is necessary to apply the electrode active material slurry to the surfaces of the current collector 31 in such a manner as to reach the desired area. Therefore, a masking process or other process can be implemented in advance on the surface of the current collector 31 other than a portion subject to application.

Pressing Step

In the method for manufacturing a battery 10 according to the present embodiment, a pressing process can also be performed on the application films obtained through the application of the electrode active material slurry. When the pressing process is implemented, it is preferable to press the surface of the application films in a state in which a porous sheet is disposed thereon. Through implementing such a pressing process, electrode active material layers 32 having higher uniformity of surface are obtained. The porous sheet is used for, inter alia, the purpose of preventing the slurry from adhering to a pressing device when the application films are pressed, or the purpose of absorbing excess electrolytic solution that percolates out during pressing. Therefore, the material and shape of the porous sheet are not particularly limited, provided that the aforementioned purpose can be achieved.

As one example, a sheet that is used as a separator in this technical field and that is similar to a microporous film or a non-woven fabric can be used as the porous sheet. Specifically, examples of the microporous film include: microporous films composed of polyimide, aramid, polyvinylidene fluoride-hexafluoropropylene (PVdF-HFP), and other hydrocarbon-based resins; and microporous films composed of glass fiber, etc. Examples of the non-woven fabric include non-woven fabrics in which the following are used alone or in a mixture: cotton, rayon, acetate, nylon, or polyester; PP, PE, or other polyolefins; and polyimide or aramid.

The porous sheet can be taken out after pressing, or can be used as a separator in the battery 10 without further modification. In cases where the porous sheet is used as a separator without further modification after pressing, the electrolyte layer 40 can be formed with only the porous sheet as a separator, or the electrolyte layer 40 can be formed such that the porous sheet and another separator are combined (specifically, there can be two or more separators).

The pressing device for implementing the pressing process is preferably a device in which pressure is uniformly applied to the entire surface of the application films. The pressure applied per unit area of the application films during pressing is not particularly limited. However, the pressure is preferably 0.01-2 MPa, and more preferably 0.1-1 MPa. When the pressure is within this range, it is possible to easily realize a void ratio and a density of the electrode active material layers 32 according to the preferred embodiment described above.

Unit Cell Formation Step

In the unit cell formation step (S20), the positive electrode 30a, the negative electrode 30b, and the separator are stacked so that the positive electrode active material layer 32a of the positive electrode 30a and the negative electrode active material layer 32b of the negative electrode 30b face each other with the separator interposed therebetween, forming the unit cell 20, as shown in FIG. 2. In this instance, the seal parts 50 are interposed between the outer peripheral portions of the positive electrode current collector 31a and the outer peripheral portions of the negative electrode current collector 31b. The seal parts 50 are preferably disposed in a frame shape along the outer peripheral portions of the current collector 31. The seal parts 50 can be disposed further outward in the planar direction than the outer peripheral portions of the current collector 31.

As indicated in the present embodiment, in cases of electrode active material layers 32 containing an electrolytic solution, the electrode active material layers 32 are wet, and therefore the separator readily clings to the electrode active material layers 32 in the unit cell formation step and creases are likely to remain in the separator. If the electrode active material layers are instead dry, the electrolyte layer does not cling to the electrode active material layers, and creases can easily be smoothed out. In addition, because the electrode active material layers 32 are soft, creases readily form in the surface of the current collector 31. In particular, in cases where the area of the electrodes 30 is high, creases more readily form in the separator and/or the current collector 31. A method for eliminating creases formed in the separator and/or the current collector 31 is described in detail in the description of the stacking step (S41).

Sealing Step

In the sealing step (S30), the outer peripheral portions of the unit cell 20 that include the seal parts 50 are sealed. Sealing means is not particularly limited, but heat sealing is preferably used from the standpoint of reliability over extended periods. In addition, the sealing step is preferably performed in an atmosphere under a substantially evacuated state. Employing a substantially evacuated state makes it possible to efficiently prevent outside air from infiltrating into a region bounded by the current collector 31 and the seal parts 50 of the unit cell 20, and carry out hermetic sealing.

A device for implementing the sealing step is not particularly limited. A conventionally well-known heat sealer can be used as appropriate.

Battery Formation Step

Figure 6:
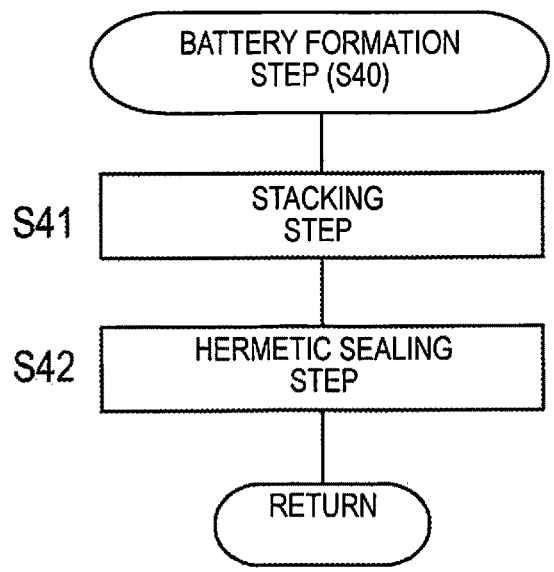
FIG. 6 is a subroutine flow chart for the battery formation step (S40) shown in FIG. 4.

A battery formation step (S40) according to the present embodiment is described next with reference to FIG. 6. FIG. 6 is a subroutine flow chart for the battery formation step (S40) shown in FIG. 4. The battery formation step (S40) according to the present embodiment has a stacking step (S41) and a hermetic sealing step (S42).

Stacking Step

Figure 7:
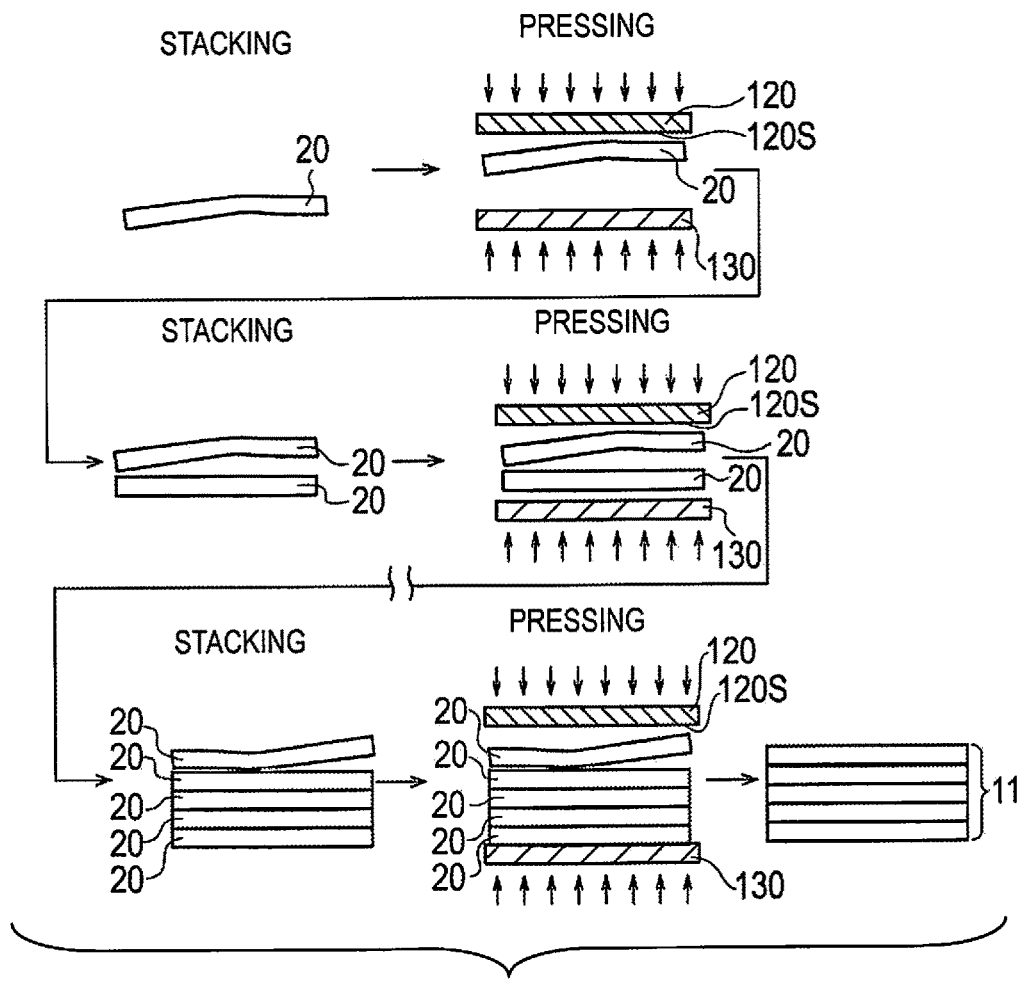
FIG. 7 is a cross-sectional diagram schematically showing a stacking step (S41) shown in FIG. 6.

FIG. 7 is a cross-sectional diagram schematically showing the stacking step (S41). In the stacking step (S41), a plurality of unit cells 20 are stacked to form a stack 11 that is a power-generating element. Specifically, as shown in FIG. 7, first a unit cell 20 is conveyed and stacked (placed). The stacked (placed) unit cell 20 is next pressed and molded from the stacking direction. Furthermore, a new unit cell 20 is conveyed and stacked on the molded unit cell 20. The unit cell 20 that was stacked previously is then pressed, together with the stacked new unit cell 20, in the stacking direction. In this instance, the unit cell 20 that was stacked previously has already been molded, and therefore the stacked new unit cell 20 is molded. These processes for stacking and pressing are repeated to finally form a stack 11 composed of a plurality of molded unit cells 20.

Because the electrodes 30 containing an electrolytic solution are soft and readily deformed, there is a possibility of deformation when the unit cells 20 are conveyed. In addition, as described above, there is a possibility that a lot of irregularities will be produced in the surface and/or the interior of the unit cells 20 due to creases formed in the separator and/or the current collector 31 in the unit cell formation step.

Through the stacking step according to the present embodiment, pressing is carried out each time the unit cells 20 are stacked, thereby making it possible to adjust the thickness of the unit cells 20 and mold the unit cells to a suitable inter-electrode distance. This makes it possible to reduce the internal resistance of the unit cells 20. In addition, irregularities in the surface and/or the interior of the unit cells 20 can be flattened by the pressing. This makes it possible to reduce the contact resistance between the unit cells 20. As a result, the internal resistance of the battery 10 can be reduced.

In the stacking step, the pressure used when pressing the unit cells 20 is preferably 9.8-39.2 (Pa), and more preferably 14.7-39.2 (Pa). In cases where the battery 10 according to the present embodiment is used as a power source for a vehicle such as an electric vehicle, a hybrid electric vehicle, a fuel-cell vehicle, or a hybrid fuel-cell electric vehicle, the pressure applied to the unit cells 20 of the battery 10 mounted in the vehicle is about 9.8 (Pa). In cases where the pressure in the stacking step is instead lower than the pressure applied when the battery 10 is mounted in a vehicle, there is a possibility that the unit cells 20 molded in the stacking step will deform due to pressure applied when the battery 10 is mounted in the vehicle. Increasing the pressure in the stacking step also makes it possible to adjust the thickness of the unit cells 20 and mold the unit cells 20 to a suitable inter-electrode distance in a short period of time. Therefore, the manufacturing time can be shortened. However, when the pressure is excessively increased, there is a possibility that the separator will break and short-circuiting will occur. Therefore, if the pressure used when pressing the unit cells 20 is a value equal to or greater than the lower-limit value described above, deformation when the battery 10 is mounted in a vehicle can be suppressed, and the time required for molding the unit cells 20 can also be shortened. Moreover, if the pressure used when pressing the unit cells 20 is a value equal to or less than the upper-limit value described above, damage to the separator due to the surface pressing step can be prevented.

The pressure used during pressing also is preferably constant in the pressing step, which is performed a plurality of times. Molding all of the stacked unit cells 20 using the same pressure makes it possible to fix the thickness of the plurality of unit cells 20.

In the stacking step, it is preferable to stack and press the unit cells 20 one at a time from the standpoint of reliably molding the unit cells 20 in pressing, but the present invention is not limited to this configuration. A plurality of unit cells can simultaneously be stacked and pressed. The phrase "stacked unit cells 20" in this specification is not limited to indicating a plurality of stacked unit cells 20, but rather can also include a single unit cell 20. Specifically, in cases where a single unit cell 20 is conveyed and placed in a first instance, the single placed unit cell 20 is also defined as "stacked unit cells 20."

Figure 8:
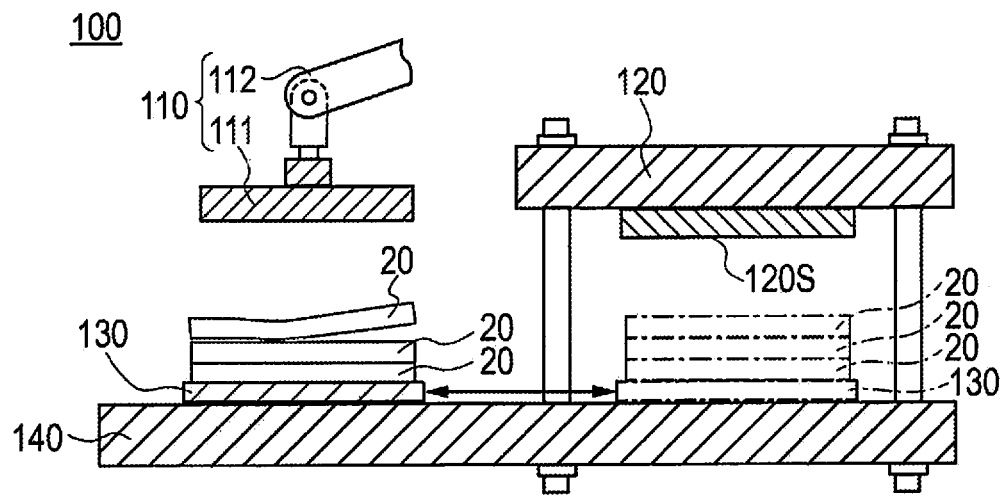
FIG. 8 is a cross-sectional diagram showing one example of a stacking/pressing device used in the stacking step (S41) shown in FIG. 6.

A stacking device and a pressing device for implementing the stacking device are not particularly limited. Conventionally well-known stacking devices and pressing devices can be used as appropriate. For example, a stacking/pressing device 100 that continuously stacks and presses the unit cells 20, as shown in FIG. 8, can be used. The stacking/pressing device 100 has a stacking part 110, a pressing part 120, a conveyance part 130, and a placement platform 140.

The stacking part 110 can be configured from, e.g., a suction head 111 that holds the unit cells 20 through use of suction force, and a hand robot 112 that drives the suction head 111. The suction head 111 is, for example, connected to a well-known negative-pressure supply source, and generates suction force through negative pressure.

The pressing part 120 can be configured from a press in which the pressure for pressing can be adjusted by controlling hydraulic pressure or other fluid pressure. The pressing part 120 is preferably configured so that a pressing surface 120S can come into surface contact with the surfaces of the unit cells 20 from the stacking direction to carry out pressing (apply surface pressing). The "surface of the unit cell 20" refers to a surface that intersects the stacking direction from among outer surfaces of the unit cell 20. Carrying out surface pressing through use of the pressing surface 120S makes it possible to fix the thickness of the unit cells 20, therefore making it possible to make the inter-electrode distance uniform. This further enhances an effect for reducing the contact resistance between the unit cells 20. In addition, bringing the pressing surface 120S into surface contact makes it possible to more reliably flatten irregularities in the surface and/or the interior of the unit cells 20 to a greater extent than in cases of linear contact such as in roll pressing.

The pressing surface 120S of the pressing part 120 also is preferably brought into surface contact with the entirety of the surface of the unit cell 20 to carry out pressing. In cases where the surface of the unit cell 20 is instead partially pressed, there is a possibility that unequal load will be applied and that defects will be produced such as non-uniformity in the thickness of the unit cell 20 and increases in resistance. Implementing surface contact with the entire surface of the unit cell 20 to carry out pressing makes it possible to uniformly mold the thickness of the unit cells 20. This makes it possible to reduce the contact resistance between the unit cells 20.

The conveyance part 130 is configured so as to be capable of moving in an alternating manner between the stacking part 110 and the pressing part 120, and conveys the stacked unit cells 20 to the stacking part 110 and the pressing part 120. In cases where the outer cladding 12 is a metal can case, the metal can case can be used as the conveyance part 130. In this case, the stacking/pressing device 100 can apply pressure while the unit cells 20 are stacked inside the metal can case, and then close a lid of the metal can case after stacking and air-tightly shutting the metal can case. In cases where the outer cladding 12 is a laminate film, a configuration can be adopted in which the laminate film is placed on the conveyance part 130, pressure is applied while the unit cells 20 are stacked on the laminate film, and then end parts of the laminate film are sealed after stacking.

A roller guide that guides movement of the conveyance part 130, a stopper for restricting movement of the conveyance part 130 and preventing the conveyance part 130 from falling off the placement platform 140, etc., can be disposed on the placement platform 140.

Hermetic Sealing Step

In the hermetic sealing step (S42), the stack 11 that is the power-generating element is sealed inside the outer cladding 12. This makes it possible to obtain the battery 10 as shown in FIG. 1.

A method for sealing the stack 11 inside the outer cladding 12 in the hermetic sealing step is not particularly limited. For example, in cases where the outer cladding 12 is a laminate film, examples of the method include a method for coating the stack 11 so as to sandwich the same from both sides along the stacking direction, and sealing end parts through use of thermal fusion, etc. In cases where the outer cladding 12 is a metal can case, examples of such methods include a method for accommodating the stack 11 inside the metal can case, air-tightly shutting the metal can case, and then using a well-known pressure-reducing device to reduce the pressure inside the metal can case.

Initial Charging Step

An initial charging step is described next. The initial charging step is performed between the unit cell formation step (S20) and the battery formation step (S40), or is performed after the battery formation step (S40).

In the initial charging step, the unit cell 20 obtained in the unit cell formation step (S20) or the battery 10 obtained in the battery formation step (S40) is subjected to initial charging. The initial charging is preferably performed while pressure is applied to the unit cell 20 or the battery 10. The pressure used when pressing the unit cell 20 or the battery 10 in the initial charging step is preferably about equal to the pressure used when pressing the unit cell 20 in the stacking step.

The method for manufacturing a battery 10 according to one embodiment of the present invention as described above exhibits the following effects.

The method for manufacturing a battery 10 has a stacking step in which a plurality of unit cells 20 are stacked, the unit cells 20 being such that a positive electrode 30a obtained by a positive electrode active material layer 32a containing an electrolytic solution being formed on a positive electrode current collector 31a, and a negative electrode 30b obtained by a negative electrode active material layer 32b containing an electrolytic solution being formed on a negative electrode current collector 31b, are stacked with a separator interposed therebetween. In the stacking step, each time a unit cell 20 is stacked, the stacked unit cells 20 are pressed from the stacking direction.

According to the method for manufacturing a battery 10, pressing each time the unit cells 20 are stacked makes it possible to adjust the thickness of the unit cells 20 and mold the unit cells 20 to a suitable inter-electrode distance. Therefore, it is possible to reduce the internal resistance of the battery 10. In addition, irregularities in the surface and/or the interior of the unit cells 20 can be flattened by the pressing, and therefore it is possible to reduce the contact resistance between the unit cells 20. As a result, the internal resistance of the battery 10 can be reduced.

In the stacking step, it is preferable to bring a pressing surface of a pressing part into surface contact with the unit cells 20 and press (apply surface pressing) from the stacking direction. Applying surface pressing by using the pressing surface of the pressing unit makes it possible to fix the thickness of the unit cells 20, and therefore it is possible to make the inter-electrode distance uniform. This further enhances the effect for reducing the contact resistance between the unit cells 20.

In addition, in the stacking step, the pressure used when pressing the unit cells 20 is preferably 14.7-39.2 (Pa). Setting the pressure used when pressing the unit cells 20 so as to be greater than about 9.8 (Pa), which is the pressure applied when the battery 10 is mounted in a vehicle, makes it possible to suppress deformation of the unit cells 20 due to pressure applied when the unit cells 20 are mounted in a vehicle. Setting the pressure so as to be equal to or less than 39.2 (Pa) makes it possible to suppress damage to the separator and the occurrence of short-circuiting.

The binder content of the electrode active material layers 32 in the electrodes 30 is preferably 1 mass % or less relative to 100 mass % of the total solid content. This reduces the binder content or eliminates the binder, thereby making it possible to improve the energy density of the battery. Because the electrode active material layers 32 are soft, it is difficult to press and mold the electrode active material layers 32 after stacking. According to the present embodiment, pressing each time the unit cells 20 are stacked adjusts the inter-electrode distance and further enhances the effect for reducing the internal resistance of the battery.

EXAMPLES

The present invention is described in further detail below through an example. However, the technical scope of the present invention is in no way limited to only the example described below.

Example

Creation of Resin Solution for Coating Negative Electrode Active Material 83 parts of ethyl acetate and 17 parts of methanol were charged into a four-neck flask fitted with a stirrer, a temperature gauge, a reflux cooling pipe, a dropping funnel, and a nitrogen gas introduction pipe, and the temperature was raised to 68° C.

A liquid monomer compound in which 242.8 parts of methacrylic acid, 97.1 parts of methyl methacrylate, 242.8 parts of 2-ethylhexyl methacrylate, 52.1 parts of ethyl acetate, and 10.7 parts of methanol were compounded, and an initiator solution in which 0.263 parts of 2,2'-azobis(2,4-dimethylvaleronitrile) was dissolved in 34.2 parts of ethyl acetate, were next continuously added dropwise under stirring into the four-neck flask over the course of four hours using the dropping funnel while nitrogen was blown into the four-neck flask, and radical polymerization was carried out. After dropwise addition was complete, an initiator solution in which 0.583 parts of 2,2'-azobis(2,4-dimethylvaleronitrile) was dissolved in 26 parts of ethyl acetate was continuously added over the course of two hours using the dropping funnel. Polymerization was furthermore continued for four hours at a boiling point. After a solvent was removed and 582 parts of a resin was obtained, 1,360 parts of isopropanol was added, and a resin solution for coating the negative electrode active material was obtained, the resin solution being composed of a vinyl resin having a resin solid content concentration of 30 mass %.

Creation of Coated Negative Electrode Active Material 88.4 parts of hardly graphitizable carbon (hard carbon) (Carbotron® PS(F) (Kureha Battery Materials Japan) was introduced into an all-purpose mixer, the resin solution for coating the negative electrode active material (resin solid content concentration: 30 mass %) obtained above was added dropwise and mixed over the course of 60 minutes in an amount of 10 parts in terms of resin solid content in a state in which stirring was carried out at room temperature and a speed of 150 rpm, and stirring was carried out for a further 30 minutes.

1.6 parts of acetylene black (Denka Black® (Denka)) was next mixed in a stirred state over the course of three instances, the temperature was raised to 70° C. while stirring was performed for 30 minutes, and the pressure was reduced to 0.01 MPa and held steady for 30 minutes to obtain a coated negative electrode active material. When the coated negative electrode active material was considered to have a core-shell structure, the average particle diameter of a hardly graphitizable carbon powder serving as the core was 9 μm. The solid content of the acetylene black was 1.6 mass % relative to 100 mass % of the coated negative electrode active material.

Creation of Coated Positive Electrode Active Material 140 parts of a lithium nickel-aluminum-cobalt oxide (NCA) (BASF Toda Battery Materials) was introduced into the all-purpose mixer, a solution in which 14.6 parts of dimethylformamide was added and mixed into 0.48 parts of a resin solution for coating the positive electrode active material (resin solid content concentration: 30 mass %) obtained above was added dropwise and mixed over the course of three minutes in a state in which stirring was carried out at room temperature and a speed of 15 m/s, and stirring was carried out for a further five minutes.

8.6 parts of acetylene black (Denka Black® (Denka)) was next mixed in a stirred state, the temperature was raised to 140° C. while stirring was performed for 60 minutes, and the pressure was reduced to 0.01 MPa and held steady for five minutes to obtain a coated positive electrode active material. When the coated positive electrode active material was considered to have a core-shell structure, the average particle diameter of a lithium nickel-aluminum-cobalt oxide powder serving as the core was 6 μm. The solid content of the acetylene black was 0.1 mass % relative to 100 mass % of the coated positive electrode active material.

Preparation of Electrolytic Solution

Li[(FSO$_2$)$_2$N](LFSI) was dissolved at a proportion of 2 mol/L in a mixed solvent of ethylene carbonate (EC) and propylene carbonate (PC) (volume ratio: 1:1) to obtain a electrolytic solution.

Preparation of Negative Electrode Active Material Slurry

From the coated negative electrode active material obtained as described above, a portion having an average particle diameter (D50) of 20 μm was separated in an amount of 616 parts, and a portion having an average particle diameter (D50) of 5 μm was separated in an amount of 264 parts. 76.5 parts of carbon fiber (Donacarbo Milled S-243 (Osaka Gas Chem), having an average fiber length of 500 μm, an average fiber diameter of 13 μm, and an electrical conductivity of 200 mS/cm) serving as an electro conductive member was added thereto, drying was carried out for 16 hours at a temperature of 120° C. and a reduced pressure of 100 mmHg, and a moisture-containing component was removed.

637.7 parts of the electrolytic solution obtained as described above was next added to the dried material described above in a dry room. The resultant mixture was stirred for 30 minutes at a rotation speed of 63 rpm and a revolution speed of 107 rpm using a mixing stirrer (5DM-r (planetary mixer) (Dalton)), whereby churning was implemented.

638.9 g of the electrolytic solution obtained as described above was then furthermore added, and the same mixing stirrer as described above was used to stir the resultant mixture in three instances for ten minutes each at a rotation speed of 63 rpm and a revolution speed of 107 rpm, whereby churning was implemented. A negative electrode active material slurry was thus obtained. The solid content concentration of the negative electrode active material slurry obtained in this manner was 41 mass %.

Creation of Positive Electrode Active Material Slurry 31.5 parts of carbon fiber (Donacarbo Milled S-243 (Osaka Gas Chem), having an average fiber length of 500 μm, an average fiber diameter of 13 μm, and an electrical conductivity of 200 mS/cm) serving as the electroconductive member was added to 1543.5 parts of the coated positive electrode active material obtained as described above, drying was carried out for 16 hours at a temperature of 120° C. and a reduced pressure of 100 mmHg, and a moisture-containing component was removed.

393.8 parts of the electrolytic solution obtained as described above was next added to the dried material described above in a dry room. The resultant mixture was stirred for 30 minutes at a rotation speed of 63 rpm and a revolution speed of 107 rpm using a mixing stirrer (5DM-r (planetary mixer) (Dalton)), whereby churning was implemented.

417.6 parts of the electrolytic solution obtained as described above was then furthermore added, and the same mixing stirrer as described above was used to stir the resultant mixture in three instances for ten minutes each at a rotation speed of 63 rpm and a revolution speed of 107 rpm, whereby churning was implemented. A positive electrode active material slurry was thus obtained. The solid content concentration of the positive electrode active material slurry obtained in this manner was 66 mass %.

Creation of Resin Current Collector 75 mass % of polypropylene (trade name "SunAllomer® PL500A" (SunAllomer)) (B-1), 20 mass % of acetylene black (AB) (Denka Black®), and 5 mass % of a modified polyolefin resin (Umex® 1001 (Sanyo Chemical Industries)) serving as a dispersant (A) for the resin current collector was melt-kneaded at a temperature of 180° C. and a speed of 100 rpm, with a residence time of 10 minutes, using a twin-screw extruder to obtain a material for the resin current collector. The resultant material for the resin current collector was extrusion-molded to obtain a resin current collector (20% AB-PP).

Creation of Electrode

The negative electrode active material slurry and the positive electrode active material slurry obtained as described above were applied to the surface of the resin current collector, and a pressing process was implemented. A positive electrode and a negative electrode were thus obtained.

Creation of Unit Cell

The positive electrode and the negative electrode were next stacked with a separator interposed therebetween to obtain a unit cell. Seal parts were disposed between outer peripheral portions of the resin current collector of the positive electrode and outer peripheral portions of the resin current collector of the negative electrode. The outer peripheral portions of the unit cell were then heat-sealed.

Unit Cell Stacking Step

As shown in FIG. 7, each time a unit cell obtained as described above was stacked one at a time, the stacked unit cells 20 were pressed (subjected to surface pressing) from the stacking direction. The pressing surface in the surface pressing was brought into surface contact with the entirety of the surfaces of the unit cells 20. The pressure used when pressing was set to 14.7 (Pa). The pressing and stacking of the unit cells 20 were repeated to obtain a stack 11.

Creation of Battery

The stack 11 obtained as described above was accommodated in a laminate film and hermetically sealed to obtain a battery.

Comparative Example

Figure 9:
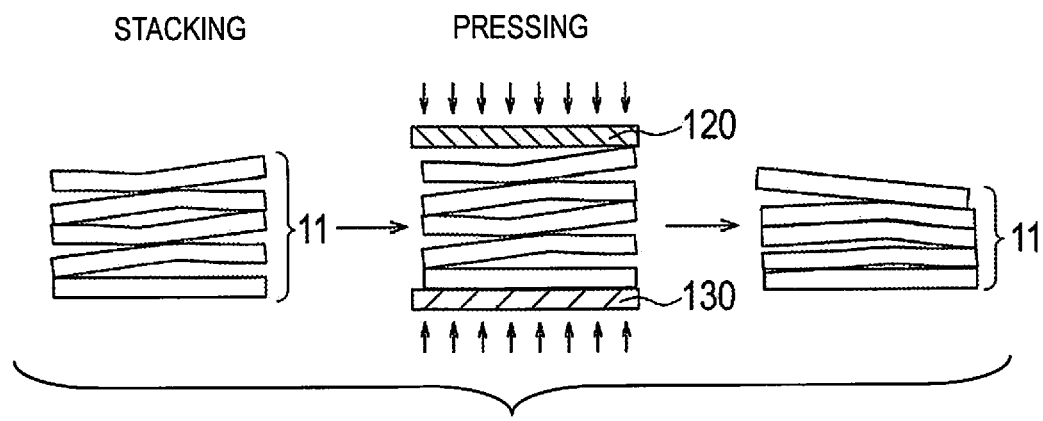
FIG. 9 is a cross-sectional diagram schematically showing a stacking step according to a comparative example.

As shown in FIG. 9, in the stacking step, after all of the unit cells 20 were stacked to form a stack 11, the stack 11 was pressed (subjected to surface pressing) all at once in the stacking direction. The pressing surface in the surface pressing was brought into surface contact with the entirety of the surface of the stack. Other manufacturing steps were the same as in the example. The pressure used when pressing was set to 14.7 (Pa).

Evaluation of Batteries

The batteries manufactured in the example and the comparative example were charged to an SOC of 50%, the ten-second value of a DC resistance (DCR) was measured, and a resistance value was calculated. The resistance values are shown in Table 1.

TABLE 1

| | Pressing method | Resistance value (mΩ/cell) |
|---|---|---|
| Example | Pressing at each instance of stacking | 5.1 |
| Comparative example | Pressing all at once after stacking | 7.0 |

As shown in Table 1, it was understood that in the case where the stacked unit cells 20 were pressed from the stacking direction each time a unit cell was stacked, as in the example, the internal resistance of the battery was lower than in the case where the unit cells were pressed all at once after being stacked, as in the comparative example. This is considered to occur for the following reason.

In the case where the stack 11 was pressed all at once from the stacking direction, as in the comparative example, the thickness of the unit cells 20 became non-uniform, and irregularities remained in the surface and/or the interior of the unit cells 20. However, pressing each time a unit cell is stacked, as in the example, made it possible to adjust the thickness of the unit cells 20 so as to be uniform, and flatten irregularities in the surface and/or the interior of the unit cells 20 through the pressing. As a result, the internal resistance of the unit cells 20 and the contact resistance between the unit cells decreased, and the internal resistance of the battery decreased.

The invention claimed is:

1. A battery manufacturing method comprising:
    forming a plurality of unit cells each comprising a positive electrode including a positive electrode active material layer containing an electrolytic solution disposed on a positive electrode current collector, a negative electrode including a negative electrode active material layer containing an electrolytic solution disposed on a negative electrode current collector, and an electrolyte interposed between the positive electrode and the negative electrode; and
    each time one of the unit cells is stacked, applying pressure to the stack of the unit cells from a stacking direction without being heated,
    in forming the plurality of unit cells, the positive electrode active material layer and the negative electrode active material layer not being subjected to a drying process performed through heating.

2. The battery manufacturing method according to claim 1, wherein
    the applying of the pressure to the stack of the unit cells includes bring a pressing surface of a pressing part into surface contact with the unit cells from the stacking direction to carry out pressing.

3. The battery manufacturing method according to claim 1, wherein
    the pressure used in pressing the unit cells is 14.7-39.2 (Pa).

4. The battery manufacturing method according to claim 1, wherein
    a binder content in the positive and negative electrode active material layers of the positive and negative electrodes is 1 (mass %) or less relative to 100 (mass %) of a total solid content.

5. The battery manufacturing method according to claim 1, wherein
    the unit cells are stacked after the unit cells are obtained and outer peripheries of the unit cells are sealed.

6. A battery manufacturing method comprising:
    forming a plurality of unit cells each comprising a positive electrode including a positive electrode active material layer containing an electrolytic solution disposed on a positive electrode current collector, a negative electrode including a negative electrode active material layer containing an electrolytic solution disposed on a negative electrode current collector, and an electrolyte interposed between the positive electrode and the negative electrode;
    sealing outer peripheries of the unit cells;
    stacking the unit cells into a stack after the outer peripheries of the unit cells have been sealed; and
    each time one of the unit cells is stacked, applying pressure to the stack of the unit cells from a stacking direction,
    in forming the plurality of unit cells, the positive electrode active material layer and the negative electrode active material layer not being subjected to a drying process performed through heating.

7. The battery manufacturing method according to claim 1, wherein
    each of the positive electrode active material layer and the negative electrode active material layer do not include a binder.

* * * * *